United States Patent [19]

Hass et al.

[11] 4,246,141

[45] * Jan. 20, 1981

[54] CATALYST FOR INCINERATING $H_2S$ TO $SO_2$

[75] Inventors: Robert H. Hass, Fullerton; Rowland C. Hansford, Yorba Linda, both of Calif.

[73] Assignee: Union Oil Company of California, Los Angeles, Calif.

[*] Notice: The portion of the term of this patent subsequent to Jan. 23, 1996, has been disclaimed.

[21] Appl. No.: 36,801

[22] Filed: May 7, 1979

Related U.S. Application Data

[63] Continuation-in-part of Ser. No. 787,904, Apr. 15, 1977, which is a continuation-in-part of Ser. No. 605,639, Aug. 18, 1975, abandoned, which is a continuation-in-part of Ser. No. 602,416, Aug. 6, 1975, abandoned, which is a continuation-in-part of Ser. No. 528,845, Dec. 2, 1974, abandoned.

[51] Int. Cl.³ ............................................. B01J 29/26
[52] U.S. Cl. ................................. 252/455 Z; 252/439
[58] Field of Search ............................ 252/455 Z, 439

[56] References Cited

U.S. PATENT DOCUMENTS

| | | | |
|---|---|---|---|
| 2,083,894 | 6/1937 | Connolly | 423/230 X |
| 2,083,895 | 6/1937 | Connolly | 423/230 X |
| 3,259,564 | 7/1966 | Kimberlin, Jr. | 208/111 |
| 3,592,760 | 7/1971 | Young | 252/455 Z |
| 3,598,878 | 8/1971 | Kovach et al. | 252/455 Z |
| 3,640,819 | 2/1972 | Watkins | 252/455 Z |
| 3,663,430 | 5/1972 | Morris | 252/455 Z |
| 3,825,613 | 7/1974 | Kmecak et al. | 585/321 |
| 3,953,587 | 4/1976 | Lee et al. | 423/576 |
| 4,088,743 | 5/1978 | Hass et al. | 423/539 |
| 4,092,404 | 5/1978 | Hass | 423/539 |

FOREIGN PATENT DOCUMENTS 733004  7/1955  United Kingdom.

*Primary Examiner*—Carl F. Dees
*Attorney, Agent, or Firm*—Gregory F. Wirzbicki; Dean Sandford

[57] ABSTRACT

A catalyst for incinerating $H_2S$ to $SO_2$ in the temperature range of 300°–900° F. comprises a vanadium oxide or sulfide supported on a refractory oxide comprising hydrogen mordenite.

17 Claims, No Drawings

CATALYST FOR INCINERATING $H_2S$ TO $SO_2$

CROSS-REFERENCE TO RELATED APPLICATIONS

This application is a continuation-in-part of copending application, Ser. No. 787,904, filed Apr. 15, 1977, which itself is a continuation-in-part of application Ser. No. 605,639, filed Aug. 18, 1975, now abandoned, which itself is a continuation-in-part of copending application Ser. No. 602,416, filed Aug. 6, 1975, now abandoned, which itself is a continuation-in-part of copending application Ser. No. 528,845, filed Dec. 2, 1974, now abandoned.

BACKGROUND OF THE INVENTION

Due to air pollution regulations which are highly stringent concerning the release of $H_2S$ to the atmosphere, it is conventional to convert $H_2S$ in waste gas streams to $SO_2$ prior to discharge to the atmosphere. Usually, this is accomplished thermally, that is, the gas stream is blended with sufficient of a fuel gas to produce a combustible mixture, which, when combusted, produces a flue gas containing $SO_2$ and essentially no $H_2S$.

As an alternative to thermal combustion, it is also known to catalytically incinerate $H_2S$ to $SO_2$ by passing $H_2S$ and $O_2$ through a bed of catalyst particles at an elevated temperature and at a space velocity sufficient to oxidize the $H_2S$ to $SO_2$. For example, in United Kingdom Pat. No. 733,004, published Jan. 23, 1953, it is taught that a catalyst composed of 5–10 wt.% $V_2O_5$ on alumina is effective for reducing $H_2S$ concentrations in Claus tail gas by conversion to $SO_2$. But such a catalyst is necessarily susceptible to sulfation, a form of catalyst deactivation wherein the alumina support is attacked in environments containing $SO_2$ plus $O_2$ or $SO_3$ or both, resulting in loss of crushing strength, surface area, and of most importance, activity.

Accordingly, it is a primary object of the invention to provide a catalyst comprising an aluminum-containing support that is highly active for incinerating $H_2S$ but is resistant to sulfation. It is another object to provide a catalyst for selectively oxidizing $H_2S$ to $SO_2$ in the presence of such gases as $H_2$, CO, $NH_3$, and light hydrocarbons (herein defined as those saturated hydrocarbon gases containing no more than six carbon atoms). Other objects and advantages will be apparent to those skilled in the art in view of the following disclosure and claims.

SUMMARY OF THE INVENTION

The catalyst of the invention comprises a vanadium oxide and/or sulfide supported on a refractory oxide comprising hydrogen mordenite. Such catalysts have been found to be highly active at 300°–900° F. for the incineration of $H_2S$ to $SO_2$, and have been further found to be selectively active for incinerating $H_2S$ contained in a gas stream also containing $H_2$, CO, $NH_3$, and light hydrocarbons, even in the presence of excess oxygen. Additionally, in comparison to catalysts comprising vanadia supported on alumina, the catalyst of the invention avoids sulfation, a form of catalyst deactivation wherein aluminum-containing components in the catalyst are converted to aluminum sulfate in environments containing $SO_2$ plus $O_2$ or $SO_3$ or both.

DETAILED DESCRIPTION OF THE INVENTION

The catalyst of the invention in its broadest embodiment comprises a vanadium oxide (e.g., $V_2O_5$, $V_2O_3$, and $VO_3$) or vanadium sulfide (e.g., $V_2S_5$ and $V_2S_3$) supported on hydrogen mordenite. The most preferred catalyst consists of about 10% by weight of vanadium oxides plus sulfides (calculated as $V_2O_5$) intimately composited with hydrogen mordenite.

Mordenite is a known zeolite of the crystalline sodium aluminosilicate variety and is available, for example, from the Norton Company of Worcester, Massachusetts under the trademark designation Zeolon ®. Since mordenite is usually found or produced in the sodium form, it must be treated so as to replace a substantial proportion, preferably at least 50%, most preferably at least 95%, of the sodium ions with hydrogen ions. This may be accomplished by any of two general ion exchange methods known in the art. The sodium mordenite may be contacted with an acid, such as hydrochloric acid, under suitable conditions so as to replace the sodium ions directly with hydrogen ions. Another method involves contacting the sodium mordenite with an ammonium-ion containing solution so as to replace the sodium ions with ammonium ions. Subsequent calcination at an elevated temperature converts the ammonium ions to hydrogen ions, thereby producing hydrogen mordenite.

Unlike most aluminosilicate zeolites, mordenite is available in a wide range of $SiO_2/Al_2O_3$ ratios, from 10:1 to about 150:1, usually from 10:1 to about 100:1. To retain hydrothermal stability, however, it is preferred herein that hydrogen mordenite be prepared in the $SiO_2:Al_2O_3$ range of 10:1 to 40:1.

If it is desired to utilize hydrogen mordenite as a support in conjunction with another porous refractory oxide support, it is preferred that the support so chosen be similar to hydrogen mordenite insofar as it be non-alkaline. As defined herein, the term "non-alkaline" characterizes a support as containing no more than about 4 weight percent, preferably less than 2 weight percent, of alkali metal or alkaline earth metal compounds, calculated as the oxides, which compounds are sufficiently basic to form salts with anionic oxides of the active metal component, e.g., vanadates. Such salt formation is believed to be at least one alkali-induced transformation leading to rapid deactivation of the catalyst. Sodium zeolites are exemplary of such undesirable basic compounds, and such zeolites must be ion exchanged to remove a substantial proportion of the sodium so as to produce a non-alkaline support as defined above. Suitable non-alkaline supports to be used in conjunction, as by intimate admixture, with hydrogen mordenite include alumina, silica, silica-alumina, silica-titania, silica-magnesia, and crystalline aluminosilicates in their hydrogen forms, such as hydrogen Y zeolite and hydrogen erionite.

It is a critical feature of the invention that the final catalyst contain vanadium components supported on hydrogen mordenite. Thus, after the hydrogen mordenite is prepared in accordance with one of the foregoing procedures or others known to those skilled in the art, it is highly preferred that the hydrogen mordenite be compounded with a vanadium compound in a manner, such as by comulling with solid ammonium metavanadate ($NH_4VO_3$), that essentially avoids the exchange of hydrogen ions for other cations. Impregnation is not preferred, as it may cause considerable ion exchange, and no compounding method, whether by impregnation or otherwise, is preferred which leaves hydrogen cations in less than 50% of the ion exchange sites.

After comulling with one or more vanadium compounds, the resulting composite is usually extruded through a die having openings therein of a desired size and shape, with ⅛ inch diameter circular openings being preferred. The extruded matter is cut to produce extrudates having lengths between 1/16 and ½ inch, which are then calcined in air at an elevated temperature, for example, a temperature in the 800°–1200° F. range, for a time period sufficient to convert the vanadium compounds to one or more of the oxides thereof. If desired, some or all of the resulting oxides may be converted to sulfides by passing a mixture of gases containing about 10 mole % $H_2S$ and the balance largely of hydrogen at a temperature between about 400° F. and 800° F. and a space velocity in the 400–600 v/v/hr range for about two hours. The final catalyst comprises about 0.2–30 wt.%, usually 1–30 wt.%, preferably 2 to 20 wt.%, of vanadium components, calculated as $V_2O_5$. The most preferred vanadium component in the final catalyst is vanadium pentoxide ($V_2O_5$), especially when present in a proportion between about 5 and 15 wt.% as $V_2O_5$.

One preparation method for producing a catalyst in accordance with the preferred embodiment of the invention is described in the following Example, which is intended to be illustrative of the invention and not limiting.

EXAMPLE I 600 gm Zeolon, a commercial synthetic sodium mordenite manufactured by the Norton Company, was slurried in 5000 ml 1.0 N HCl at room temperature for 60 minutes. It was then filtered and the treatment was repeated on the filter cake. The filter cake from the second treatment was slurried in hot 1.0 N HCl (73° C.) for one hour, then filtered, and finally washed on the filter with four 1000 ml washes of hot water. After the filter cake was dried, the $Na_2O$ content was 0.57% by weight (about 93% exchanged to the hydrogen form). The hot treatment was repeated twice more for 45 minutes each, after which time the $Na_2O$ level was 0.21% by weight (97.5% exchanged). The amount of aluminum extracted was relatively small, so the product had a $SiO_2/Al_2O_3$ ratio of 11.5 compared to the original ratio of 10.

An amount of the dried hydrogen mordenite, corresponding to 225 gm of anhydrous powder, was mulled together with 424 gm of a silica hydrogel (containing about 6% $SiO_2$ or 25 gm of anhydrous silica) and 36.1 gm of $NH_4VO_3$ (or 27.8 gm of $V_2O_5$). The mixture was dried during mulling with a flow of hot air until it was of extrudable consistency. It was then extruded through a ⅛-inch die, dried, and calcined in air at 932° F. for 3 hours. The product containing 10% by weight of $V_2O_5$ had excellent physical properties and had a deep golden color.

Catalysts prepared in accordance with the invention have been found to exhibit high activity for converting $H_2S$ to $SO_2$ in the gas phase. In addition, such catalysts are highly selective throughout the temperature range of 300°–900° F. for incinerating $H_2S$ to $SO_2$ without forming essentially any $SO_3$ and without oxidizing any $H_2$, CO, $NH_3$, or light hydrocarbons which may be present with the $H_2S$. Of particular importance is the fact that the catalyst is resistant to sulfation and hence is remarkably stable and capable of use for extended time periods, easily in excess of 90 days, usually in excess of 1 year, without substantial deactivation.

Gas streams subjected to incineration by contact with the catalyst of the invention typically contains 10 ppmv to about 2.0 vol.% $H_2S$, although on occasion a gas stream may be encountered containing up to 10.0 vol. % $H_2S$. Other components present in the gas stream include any of the following: $N_2$, $CO_2$, CO, $H_2$, $SO_2$, $O_2$, Ar, $NH_3$, $H_2O$, and light hydrocarbons. Other gaseous components may also be present provided they do not detrimentally affect the catalyst or interfere with the intended incineration of $H_2S$. Especially preferred gas streams for treatment herein are those containing at least about 100 ppmv of $H_2S$ and at least 500 ppmv of one or more components selected from the group consisting of $H_2$, $NH_3$, CO, and light hydrocarbons.

The gas streams treated by incineration herein should either contain sufficient oxygen or be blended with sufficient oxygen or air so as to provide at least the stoichiometric proportion required for:

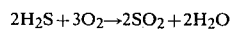

$$2H_2S + 3O_2 \rightarrow 2SO_2 + 2H_2O$$

More preferably, oxygen is present in a proportion in excess of stoichiometric, usually in a proportion of 1.1–5.0 times the stoichiometric, preferably between 1.1 and 2.5 times stoichiometric. Other conditions usually employed in incinerating $H_2S$ in an adiabatic or isothermal reactor include (a) operating pressures between about 5 and 500 psia, with pressures of 15–75 psia being preferred, (b) inlet operating temperatures in the range of 300°–900° F., with temperatures below about 600° F. being preferred, and (c) space velocities between 100 and 50,000 v/v/hr (calculated according to gas volumes at 60° F. and 1 atmosphere), with 500–5000 v/v/hr being preferred. Operating conditions are appropriately adjusted so that at least 90% of the $H_2S$ is incinerated to $SO_2$, preferably so that essentially all the $H_2S$ is incinerated to $SO_2$.

As stated previously, hydrogen mordenite is hydrothermally stable, that is, in the presence of water vapor at elevated temperature, hydrogen mordenite, particularly in $SiO_2:Al_2O_3$ ratios less than 40:1, resists degradation due to silica volatilization or reaction with water vapor. However, it has been found that incineration of $H_2S$ in the presence of water vapor does present a problem at temperatures in the 300°–600° F. range. At water vapor partial pressures in excess of about 1.5 psia, the catalysts herein exhibit a lack of cavity for incinerating $H_2S$, which is believed due to saturation of the catalyst pores with water. Accordingly, it is preferred in the invention when water vapor is present in a proportion sufficient to produce more than 1.5 psia of partial pressure that operating temperatures in the 600°–900° F. range be utilized. For water vapor partial pressures less than about 1.5 psia, useful results are obtained throughout the 300°–900° F. range.

The following Example demonstrates the high conversions of $H_2S$ to $SO_2$ obtainable with the catalyst of the invention.

EXAMPLE II

In several different experimental runs, a feed gas mixture (water vapor dew point = 68° F. and water partial pressure of 0.34 psia) having the average dry composition shown in Table I was passed through a catalytic reactor containing a bed of catalyst particles prepared as in Example I. Each of the seven runs was performed at a different temperature as shown in Table I, but in all other respects the conditions were the same: a space velocity of 4189 v/v/hr (at 60° F. and 1 atm) and a pressure slightly above atmospheric. The results of the experiment are summarized in columns 1 through 7 of Table I, and as shown, conversions in excess of 95% were consistently obtained. Also, essentially no $H_2$ or $CH_4$ in the feed was oxidized during the experiment.

silica based catalyst known to have comparable activity to that of the mordenite catalyst for incinerating $H_2S$.

EXAMPLE IV

A $V_2O_5$-on silica catalyst was prepared as follows:
Two solutions (A) and (B) were prepared as follows:
(A) 70 ml of concentrated (96%) $H_2SO_4$ was diluted to 2500 ml with deionized water and cooled to 10° C;
(B) 665 ml of 41 Be commercial sodium silicate (sp.

TABLE I

| Run No. | | 1 | 2 | 3 | 4 | 5 | 6 | 7 |
|---|---|---|---|---|---|---|---|---|
| Temperaure of Run, °F. | | 502 | 601 | 701 | 802 | 853 | 883 | 903 |
| Component | Feed | | | | | | | |
| $H_2$, mol % | 16.48 | 16.94 | 16.61 | 15.59 | 16.34 | 15.78 | 15.62 | 15.82 |
| $CH_4$, mol % | 12.03 | 12.19 | 12.39 | 12.58 | 12.34 | 12.50 | 12.77 | 12.56 |
| $N_2$, mol % | 11.46 | 11.73 | 11.73 | 12.05 | 11.81 | 11.67 | 12.06 | 11.65 |
| $O_2$, mol % | 2.79 | 0.99 | 0.55 | 0.09 | 0.41 | 0.41 | 0.35 | 0.14 |
| Ar, mol % | 0.13 | 0.14 | 0.14 | 0.14 | 0.14 | 0.14 | 0.14 | 0.13 |
| $CO_2$, mol % | 55.88 | 56.84 | 57.29 | 58.32 | 57.72 | 58.11 | 57.77 | 58.33 |
| $H_2S$, ppmv | 12059 | 316 | 27 | 108 | 26 | 23 | 16 | 26 |
| $CH_3SH$, ppmv | 13 | 0 | 0 | 0 | 0 | 4 | 0 | 15 |
| COS, ppmv | 15 | 14 | 17 | 30 | 34 | 49 | 27 | 27 |
| $SO_2$, ppmv[2] | 193 | 11306 | 12874 | 12271 | 12307 | 13826 | 12907 | 13594 |
| $CS_2$, ppmv | 6 | 30 | 4 | 7 | 7 | 8 | 6 | 6 |
| $NH_3$, ppmv | 500 | — | — | — | — | — | — | — |
| Total S compounds, ppmv[1,2] | 12292 | 11696 | 12926 | 12423 | 12381 | 13918 | 12962 | 13674 |
| % $H_2S$ Conversion | — | 97.3796 | 99.7761 | 99.1044 | 99.7844 | 99.8093 | 99.8673 | 99.7844 |

[1]Expressed as ppmv $SO_2$ or ppmv monatomic sulfur compounds.
[2]The slight increase of total sulfur compounds is due to analytical errors in determining $SO_2$; $SO_2$ values should be somewhat lower.

The following Example compares the sulfation resistance of the catalyst of the invention to that of a 10% $V_2O_5$ on alumina catalyst known to have comparable activity for incinerating $H_2S$.

EXAMPLE III

A 10% by weight $V_2O_5$ on alumina catalyst was prepared as follows: 200 gm of $Al_2O_3$ (as hydrated spray-dried alumina) was soaked in a hot solution of 28.5 gm of $NH_4VO_3$ in 500 ml water. The paste so formed was dried at 90°–100° F., remoistened and extruded through a ⅛ inch die, dried at 212° F. and calcined at 932° F. for 3 hours.

The foregoing catalyst and a catalyst of the invention prepared in the manner of Example I were each used to incinerate $H_2S$ in a feed gas (water vapor dew point=68° F. and water partial pressure of 0.34 psia) having the dry feed composition shown in Table I. After the alumina based catalyst had been continuously used for 8 days and the mordenite based catalyst for 18 days under comparable operating conditions of: pressure 3.5–15 in. $H_2O$ (above atmospheric); GHSV=4189; operating temperature range of 300°–950° F., the catalysts were analyzed for sulfur content by means of an induction furnance analytical technique (ASTM) D-1552 modified for determination of sulfur in inorganic solids). The alumina based catalyst was found to contain 2.21% sulfur while the mordenite based catalyst contained only 0.54% sulfur. Since no sulfur could be leached from either catalyst by a carbon disulfide extraction, it was concluded that the sulfur was present in the catalyst as sulfate. Thus, although the mordenite based catalyst was used to incinerate $H_2S$ for 10 more days of sustained operation than the alumina based catalyst, it was found to be sulfated less than 25% as much.

The following Example compares the hydrolytic stability of a mordenite based catalyst with that of a gr. 1.394, 28.65 wt.% $SiO_2$ and 8.90 wt.% $Na_2O$) was diluted to 2500 ml with deionized water and cooled to 10° C. When equal volumes of (A) and (B) were mixed, the pH was too low for rapid gelation, so 3.0 gm NaOH was dissolved in solution (B).

Solution (B) was poured rapidly into Solution (A); with stirring and after 4½ minutes the mixture set to a vibrant hydrogel. After syneresis overnight, the hydrogel was cut into ½- to 1-inch pieces and placed on a large Buchner funnel. It was washed free of sodium by soaking in 0.3 N $HNO_3$ for half an hour, followed by draining and repeating of this sequence four times. The product so formed was then washed with water in the same way for a total of five times.

The hydrogel was partially dried and then mulled with enough $NH_4VO_3$ to give 10% by weight of $V_2O_5$ and 90% by weight of $SiO_2$ in the final calcined product. The moisture content of the mulled mixture was adjusted until an extrudable product was formed. It was then extruded, dried, and calcined as were the extrudates in Example I.

The foregoing catalyst and a 10% $V_2O_5$ on mordenite catalyst prepared as in Example I were each steamed at 850° F, for 112 hours. Saturated steam was used. The physical characteristics of the catalysts after this severe hydrothermal treatment are shown in Table II.

TABLE II

| Physical Characteristics | Vanadia-Mordenita | | Vanadia-Silica | |
|---|---|---|---|---|
| | Fresh | After Steam | Fresh | After Steam |
| Crushing Strengths, pounds per 1/8" | 7.0 | 6.3 | 2.7 | 2.3 |
| Surface Area, m²/gm | 467 | 349 | 554 | 296 |

As shown by the foregoing data, the hydrogen mordenite based catalyst exhibited a much lower percentage loss of both crushing strength and surface area then did the silica based catalyst. The mordenite catalyst is clearly superior to the silica catalyst in terms of hydrothermal stability.

Although the invention has been described in conjunction with specific Examples and embodiments thereof, it is evident that many alterations, modifications, and variations will be apparent to those skilled in the art in light of the foregoing description. Accordingly, it is intended in the invention to embrace all such alternatives, modifications, and variations as may fall within the spirit and scope of the appended claims.

We claim:

1. A catalyst composition consisting essentially of between about 1 and 30 weight percent $V_2O_5$ as the essential active component supported on a non-alkaline, porous refractory oxide comprising hydrogen mordenite having a silica-to-alumina ratio between about 10:1 and 100:1.

2. A catalyst composition as defined in claim 1 wherein said hydrogen mordenite has a silica-to-alumina ratio between about 10:1 and 40:1.

3. A catalyst composition as defined in claim 2 wherein said essential active component comprises between about 5 and 15 weight percent $V_2O_5$.

4. A catalyst composition consisting essentially of one or more essential active components selected from the class consisting of vanadium oxides and sulfides, said one or more essential active components being supported on a non-alkaline, porous refractory oxide comprising crystalline hydrogen mordenite, said hydrogen mordenite having a silica-to-alumina ratio between about 10:1 and 100:1.

5. A catalyst composition consisting essentially of one or more active components selected from the group consisting of vanadium oxides and sulfides, said active components being supported on a non-alkaline refractory oxide support comprising mordenite having a substantial proportion of the ion exchange sites occupied by hydrogen ions.

6. A catalyst composition as defined in claim 5 wherein said mordenite support has a silica-to-alumina ratio between about 10:1 and 40:1.

7. A catalyst composition as defined in claim 6 wherein said catalyst comprises between about 5 and 15 weight percent of vanadium oxides, calculated as $V_2O_5$.

8. A catalyst composition as defined in claim 6 wherein vanadium oxides and sulfides comprise between about 1 and 30 weight percent of the catalyst composition, calculated as $V_2O_5$.

9. A catalyst composition consisting essentially of 5-15 weight percent of one or more essential active components selected from the group consisting of vanadium oxides and sulfides, calculated as $V_2O_5$, said active components being supported on a refractory oxide support consisting essentially of silica and hydrogen mordenite having a silica-to-alumina ratio between about 10:1 and 40:1.

10. A catalyst composition for incinerating $H_2S$ to $SO_2$ prepared by the method including the steps of ion exchanging a sodium mordenite so as to replace a substantial proportion of the sodium ions with hydrogen ions, thereby producing a hydrogen mordenite, comulling said hydrogen mordenite with ammonium metavanadate, and calcining the produced composite of hydrogen mordenite and ammonium metavanadate at an elevated temperature sufficient to convert the ammonium metavanadate to one or more oxides of vanadium.

11. The catalyst of claim 10 wherein the amount of ammonium metavandate comulled with the hydrogen mordenite is such that the catalyst produced upon calcining contains between about 5 and 15 weight percent of vanadium oxides, calculated as $V_2O_5$.

12. The catalyst of claim 10 wherein the hydrogen mordenite and ammonium metavanadate are comulled with silica.

13. A catalyst composition for incinerating $H_2S$ to $SO_2$ prepared by the method including the steps of ion exchanging a sodium mordenite so as to replace a substantial proportion of the sodium ions with hydrogen ions, thereby producing a hydrogen mordenite, comulling said hydrogen mordenite with a vanadium compound convertible to one or more vanadium oxides by calcining in the presence of oxygen at an elevated temperature, and calcining the comulled mixture at an elevated temperature sufficient to convert the vanadium compound to said vanadium oxides.

14. A catalyst composition prepared as in claim 13 wherein the resulting catalyst is sulfided by contact with a gas stream containing $H_2S$.

15. The catalyst of claim 14 wherein the hydrogen mordenite is comulled with a vanadium compound and silica.

16. The catalyst of claim 15 wherein the resulting catalyst contains between about 5 and 15 weight percent of vanadium oxides plus sulfides, calculated as $V_2O_5$.

17. A catalyst composition consisting essentially of one or more active components selected from the group consisting of vanadium oxides and sulfides on a support comprising hydrogen mordenite, said support containing, in a proportion no greater than 4 weight percent, calculated as the oxides thereof, alkali compounds and alkaline earth compounds capable of reacting with said active components to produce compounds containing vanadium in anionic species.

* * * * *